United States Patent
Munoz Saez

(10) Patent No.: US 10,174,806 B2
(45) Date of Patent: Jan. 8, 2019

(54) FLYWHEEL

(71) Applicant: Cesar Juan Munoz Saez, Barcelona (ES)

(72) Inventor: Cesar Juan Munoz Saez, Barcelona (ES)

(*) Notice: Subject to any disclaimer, the term of this patent is extended or adjusted under 35 U.S.C. 154(b) by 0 days.

(21) Appl. No.: 15/443,489

(22) Filed: Feb. 27, 2017

(65) Prior Publication Data

US 2017/0248192 A1   Aug. 31, 2017

(30) Foreign Application Priority Data

Feb. 29, 2016  (ES) .................................. 201630253

(51) Int. Cl.
*F16F 15/31* (2006.01)
*A63B 21/06* (2006.01)
(Continued)

(52) U.S. Cl.
CPC .............. *F16F 15/31* (2013.01); *A63B 21/06* (2013.01); *A63B 21/154* (2013.01); *A63B 21/225* (2013.01); *F16F 2222/08* (2013.01); *F16F 2230/0005* (2013.01); *F16F 2230/0041* (2013.01); *F16F 2232/02* (2013.01); *F16F 2234/06* (2013.01)

(58) Field of Classification Search
CPC .......... F16F 15/31; F16F 15/286; F16F 15/30; F16F 2222/08; F16F 2230/0005; F16F 2230/0041; F16F 15/315; F16F 15/3153; F16F 15/14; Y02E 60/16; Y10T 74/2117; Y10T 74/2119; Y10T 74/2121; Y10T 74/2132; H02K 7/02; H02K 7/025; F16C 2361/55; F16C 15/00
See application file for complete search history.

(56) References Cited

U.S. PATENT DOCUMENTS

| 393,059 A * | 11/1888 | Copeland ............ F16H 63/3416 74/577 R |
| 4,648,287 A * | 3/1987 | Preskitt .................... B62M 3/02 74/594.1 |

(Continued)

FOREIGN PATENT DOCUMENTS

| FR | 898779 A * | 5/1945 | .............. B62M 3/02 |
| WO | WO-2014161030 A1 * | 10/2014 | .............. H02K 7/025 |

OTHER PUBLICATIONS

Machine Translation of FR 898779, obtained Sep. 13, 2018.*

*Primary Examiner* — Richard W Ridley
*Assistant Examiner* — Brian J McGovern
(74) *Attorney, Agent, or Firm* — Avery N. Goldstein; Blue Filament Law PLLC

(57) ABSTRACT

A flywheel for example to a sport training or a rehabilitation machine, is linked to a hauling cable through a system of pulleys, including, in a well-known way, at least a disk-shaped part (4) rotating about a central axis (5) and incorporates a series of weights (6) that, depending on their distribution and their own weight provide a given moment of inertia. Starting from this already known configuration, the flywheel (1) is distinguished in that it has a moving coupling means (7) that allows the variation of the position of the weights (6) on the disk (4) of the wheel and to modify the moment of inertia, without it being necessary to withdraw or replace any of the weights (6) or the disk (4).

9 Claims, 2 Drawing Sheets

(51) Int. Cl.
*A63B 21/00* (2006.01)
*A63B 21/22* (2006.01)

(56) References Cited

U.S. PATENT DOCUMENTS

| | | | | |
|---|---|---|---|---|
| 4,973,046 A | * | 11/1990 | Maxwell | A63B 21/00178 482/60 |
| 5,338,272 A | * | 8/1994 | Sweeney, III | A63B 22/0012 482/57 |
| 2005/0239609 A1 | * | 10/2005 | Chen | B62M 3/00 482/57 |
| 2010/0130331 A1 | * | 5/2010 | Hu | A63B 22/0046 482/57 |
| 2012/0065028 A1 | * | 3/2012 | Gray | A63B 22/0605 482/57 |
| 2013/0283964 A1 | * | 10/2013 | Chen | A63B 21/225 74/572.21 |

\* cited by examiner

FLYWHEEL

OBJECT OF THE INVENTION

The invention, as stated in the title of this specification, refers to a flywheel for example to be used in sport training or rehabilitation machines, that provides, to the function to which it is designed, advantages and characteristics that will be disclosed thereafter and that bring about a novelty in the state of the art.

The object of this invention refers to a flywheel applicable, for example, in gymnastic inertial, sport training or rehabilitation machines the structural configuration of which is especially designed to be able to quickly and simply modify the moment of inertia, without adding or removing mass to the wheel of the invention.

FIELD OF APPLICATION OF THE INVENTION

The field of application of this invention is within the sector of the industry engaged in production of flywheels, especially those used in machines, equipment and devices for physical and sport training or rehabilitation, focused namely in those including inertial motion.

BACKGROUND OF THE INVENTION

As it is well known, the inertial motion machines are namely used for sport training since some years ago. Their operation is based on presenting a disk- or a wheel-shaped structure with a moment of inertia that, when rotating it around an axis, generates a rotational kinetic energy.

The problem of these machines is that, until now, the way of changing their moment of inertia was based on adding or removing weights to the inertial disk or flywheel or, directly, on changing the flywheel itself to be replaced by another having a different weight and/or radius.

The said action causes that the suitable adjustment of the moment of inertia for each user or exercise is a slow and cumbersome process.

In addition, the said exchanging disks or adding and removing weights, makes that there are loose elements that can be lost or be little practical for the commercial use.

The objective of this invention therefore is, to develop a new type of flywheel that allows to overcome these problems described allowing to vary the moment of inertia as suitable for each user or in each exercise, without removing or putting weights, and therefore in a much quicker, practical and simple way.

On the other hand, and as reference to the state of the art, it can be pointed out that, at least this applicant is not aware of the existence of any other flywheel for this type of machines or any other invention of similar application, showing technical, structural and constitutive techniques similar to those presented and claimed.

DESCRIPTION OF THE INVENTION

The flywheel especially adapted to be used in the sport training or rehabilitation machines proposed by the invention is therefore configured as a novelty within its field of application, because when implementing it the mentioned objectives are satisfactorily reached, the features making it possible are included in the final claims attached to this specification.

Concretely, what the invention proposes, as it was mentioned before, is a flywheel, namely applicable in gymnastic, sport training or rehabilitation inertial machines, the structural configuration of which is distinguished for allowing to modify the moment of inertia, without adding or removing weights and it is achieved by varying the distribution of the mass within the wheel.

The moment of inertia of a solid, cylindrical flywheel is calculated by means of the following mathematical formula:

$$I = \frac{1}{2}MR^2$$

I: Inertia
M: Mass of the wheel
R: Radius of the wheel

The calculation of the inertia of flywheels having other shapes must be carried out by means of another mathematical formula but a direct relation between the mass and turning radius always exists.

For this purpose, the said wheel is configured so that it incorporates moving coupling means for the weights that allow to change the said distribution of the mass and achieve this modification of the moment of inertia, namely means that allow to vary the radius, that means, the gap to the centre of the disk, of a part or the full mass, without adding or removing elements.

In the preferred embodiment of the invention, the wheel includes a disk showing on its surface a series of slots in which the weights are located, being coupled so that they can be moved in different areas of the said slots in order that they can be fixed more or less close to the spin axis and, so, they allow to vary the moment of inertia without changing the disk or adding or removing any of the elements of the assembly.

In another preferred embodiment, the weights include an internal thread and they can be radially moved along threaded pins.

The main advantages provided by the wheel of the invention are that, from the commercial standpoint they mean the great advantage that a machine can be quickly exchanged by several users and easily and suitably configured for each user and/or movement.

It is also a great advantage for the large sport facilities or centres where many users use the machines, especially in order that there are no free or loose elements that could cause incidents, loss of their functionality or misuse.

Likewise, another significant advantage is that quickly and simply, a same user can adapt the moment of inertia he is willing depending on the exercise he is carrying out.

The flywheel of the invention consists, therefore, in an innovating structure having characteristics unknown until now for the purpose to which it is designed, reasons that jointly to its practical utility, provide it with sufficient ground to obtain the privilege of exclusivity applied for.

DESCRIPTION OF THE DRAWINGS

To complement the description that is carried out and in order to assist to a best understanding of the characteristics of the invention, attached to this specification, as an integral part thereof, is a set of drawings in which, for illustration and no limitation purpose, the following has been represented.

PREFERRED EMBODIMENT OF THE INVENTION

Figure 1:
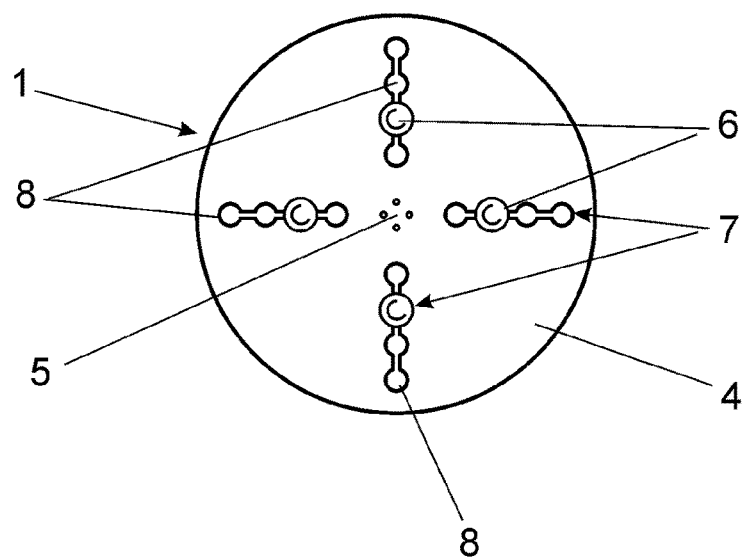
FIG. 1—It shows an elevation view of the flywheel together with the parts composing the weights.

From the said figures, and according to the numbering chosen, a no limiting example of embodiment of the flywheel of the invention can be seen, which includes the parts and elements stated and described below.

Thus, as it is apparent in the said figures, the wheel (1) in question is designed to be incorporated for example to a sport training or rehabilitation machine, linked to a hauling cable through a system of pulley, including, in a well known way, at least a disk-shaped part (4) rotating about a central axis (5) and incorporates a series of weights (6) that, depending on their distribution and their own weight provide a given moment of inertia. Starting from this already known configuration the wheel (1) is distinguished in that it has moving coupling means (7) that allow to vary the position of the said weights (6) on the disk (4) of the wheel and to modify the moment of inertia, without it is necessary to withdraw or replace any of the weights (6) or the disk (4).

Preferably, the moving coupling means (7) allow to independently vary the gap between the weights (6) with respect to the central axis (5) of the disk (4). In general the weights have to be symmetrically located with respect to the central axis (5) in order the inertial movement is regular.

In a preferred embodiment of the invention, the moving coupling means (7) of the weights (6) to the disk (4) include a series of slots (8) performed in the disk (4) in which the weights (6) can be moved to be fixed on different areas of them and because of the fact that the weights (6) show a configuration that allows that an easy travel and their fixation in different areas of the slots (8) without they have to be withdrawn.

Figure 2:
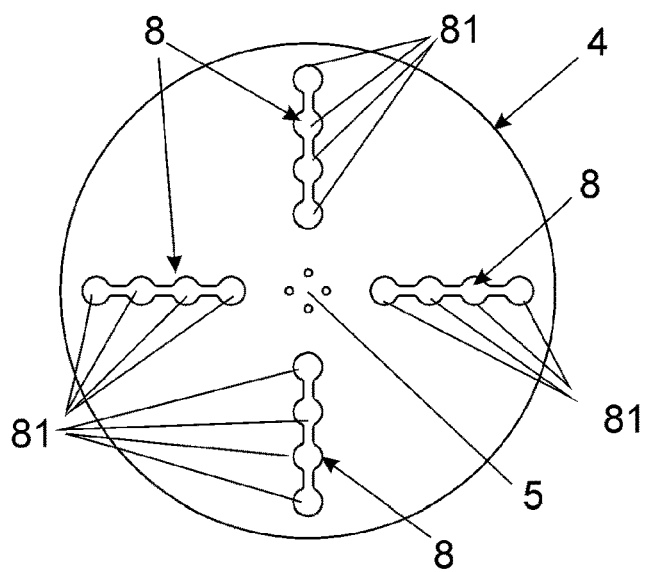
FIG. 2—It shows an elevation view of the flywheel (without the parts composing the weights), showing the radial slots it incorporates to place the weights.

As it is apparent in the FIG. 2, the slots (8) that are radially arranged on the disk (4) around its central axis (5), are through slots, in order they can be crossed by the weights (6), and such slots showing a series of widenings (81) marking, in coinciding points in all of them, the different areas of weights positioning (6), allowing to carry out the travel of one or more weights (6) in each slot (8) of the disk (4) in a balanced way, to bring it more or less close to the said central axis (5) and this way modify the moment of inertia.

Figure 3:
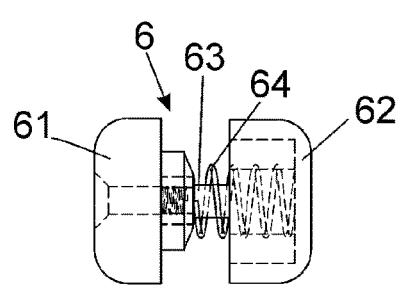
FIG. 3—It shows an elevation view of the parts composing the weights duly mounted.
Figure 4:
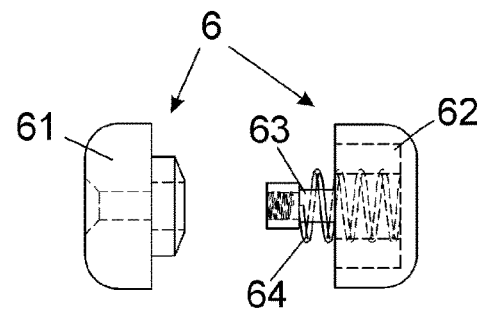
FIG. 4—It shows an elevation view of the parts composing the weights dismounted.
Figure 5:
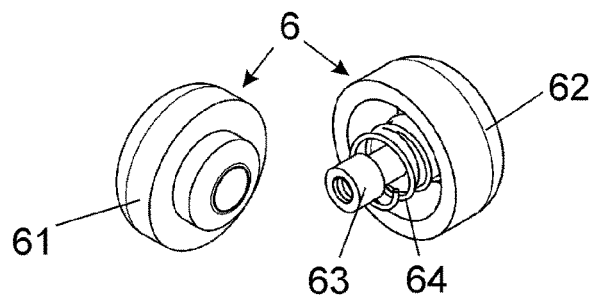
FIG. 5—It shows a perspective view of the parts composing the weights dismounted.

Meanwhile, the weights (6), as shown in the FIGS. 3 to 5, in the preferred embodiment are constituted by two independent parts, a back one (61) and a front one (62) that are coupled by the respective back and front sides of the disk (4), inserted in the slots (8), through a connecting rod (63) that allows such coupling, for example working through threading, resulting adapted to allow the travel of the weights (6) through the slots (8) to place them on the widening (81) sought without their withdrawal from them is necessary.

Also the connecting rod (63) shows two different diameters (one wider tan the other) and it incorporates a spring (64) so that when the weight (8) is pressed towards the disk this later can travel through the slots (8) from a widened area (81) to another and when the pressure on it is released it remains locked in the widened area where it is located when the diameter of the rod is coincident with the diameter of the widened area.

Advantageously, although without it means a limitation, the disk (4) has available several slots (8) spread equidistant and radial around the central axis (5) and, also in a preferred but not limiting way, each of the said slots (8) incorporates, at least a weight (6).

As it can be deducted, to modify the moment of inertia of this wheel (1) in the said machine, it will be sufficient to move the weights (6) and have them travelling through the related slots (8) of the disk (4) to bring them more or less close to the central axis (5) and, therefore without it is necessary to withdraw or change the disk.

In another preferred embodiment, the moving coupling means (7) of the weights (6) to the disk (4) include a series of Z-shaped slots (8), and the weights remain fixed by a magnet. In this preferred embodiment there would be no widenings, and the disk would remain locked by each angle of the Z when it is subject to a centrifugal energy.

In another embodiment, the moving coupling means (7) of the weights (6) to the disk (4) include a series of threaded pins (8) radially located on the disk (4) in which the weights (6) incorporating an internal thread can move to be fixed in different areas thereof.

The nature of this invention being sufficiently disclosed, as well as the way of implementing it, it is not deemed necessary to provide a wider explanation in order that any expert on the matter understands its scope and the advantages arising from it, stating that, within its essence, it can be implemented with other embodiments different in details of the one disclosed for example purpose and which the protection sought also includes provided that the main principle is not altered, changed or modified.

The invention claimed is:

1. A flywheel including:
   a disk-shaped part rotating about a central axis;
   a series of weights distributable with respect to the central axis, where a distribution of the series of weights provides a given moment of inertia for said flywheel;
   each of the series of weights is disposed within a respective elongated slot, the respective elongated slot having a respective series of widenings positioned along a respective length of the respective elongated slot, each of the respective series of widenings being respectively cylindrical and having a respective diameter greater than a respective width of the respective elongated slot; and
   wherein each of the series of weights includes a respective back part and a respective front part joined with a respective connecting rod, the respective connecting rod having a respective first diameter and a respective second diameter, the respective first diameter is larger than the respective second diameter;
   wherein each of the series of weights includes a respective spring disposed on the respective connecting rod and having a respective axial center axis that is parallel to a respective axial center axis of the respective connecting rod.

2. The flywheel according to claim 1, wherein each of the series of weights has a respective distance to the central axis that can be modified by movement between the respective series of widenings.

3. The flywheel according to claim 1, wherein each of the series of weights is configured to travel along the respective length of the respective elongated slot without removing each of the series of weights from the flywheel.

4. The flywheel according to claim 3, wherein the respective elongated slots are equidistantly and radially spread around the central axis.

5. The flywheel according to claim 1, wherein for each of the series of weights, the respective elongated slot radiates outward from the central axis.

6. The flywheel according to claim 1, wherein for each of the series of weights, the respective elongated slot extends completely through a width of the disk-shaped part from a front face to a back face of the disk-shaped part.

7. The flywheel according to claim 6, wherein for each of the series of weights, the respective back part is disposed adjacent to the back face and the respective front part is disposed adjacent to the front face.

8. The flywheel according to claim 7, wherein for each of the series of weights, the respective connecting rod includes a respective screw and a respective thread for coupling the respective back part to the respective front part.

9. The flywheel according to claim 1, wherein each of the series of weights includes a respective locked position and a respective adjustment position, wherein within the respective locked position the respective first diameter is disposed within a respective one of the respective series of widenings, wherein in order to transition from the respective locked position to the respective adjustment position each of said series of weights is pressed towards the disk-shaped part such that the respective second diameter enters the respective one of the respective series of widenings which allows the respective second diameter to pass through a respective portion of the respective elongated slot having the respective width of the elongated slot until the respective diameter is disposed within a respective second one of the respective series of widenings.

* * * * *